United States Patent [19]

Pierce

[11] 3,911,513
[45] Oct. 14, 1975

[54] BEEHIVE OPENING TOOL
[76] Inventor: Paul W. Pierce, 1630 W. 9th St., Upland, Calif. 91786
[22] Filed: Feb. 7, 1974
[21] Appl. No.: 440,499

[52] U.S. Cl. .................................... 6/12 R; 6/12 R
[51] Int. Cl.² ........................................... A01K 51/00
[58] Field of Search .............. 6/1, 2 R, 2 A, 10, 11, 6/12 R, 12 M

[56] References Cited
UNITED STATES PATENTS

| | | | |
|---|---|---|---|
| 976,031 | 11/1910 | Blagg | 6/12 R |
| 2,369,815 | 2/1945 | Coakley | 6/12 R |
| 2,875,454 | 3/1959 | Southwick | 6/12 R |
| 3,523,314 | 8/1970 | Homins | 6/12 R |
| 3,758,896 | 9/1973 | Croan | 6/10 |

Primary Examiner—Robert Peshock
Assistant Examiner—J.Q. Lever
Attorney, Agent, or Firm—Dana E. Keech

[57] ABSTRACT

A pair of short angle iron shear wedges pivotally mounted on opposite ends of a transverse bar co-extensive with the end of a beehive and having handles actuated in the horizontal plane in which one hive super rests upon another, to wedge apart said supers a distance equal to the thickness of said wedges and then, by prying downward on the handles, employ said wedges as dual pry bars to further separate said supers. The transverse bar also mounts a free-hanging-frame depressing plate which is slidable into the space thus produced between said supers to engage honeycomb frames hanging in the lower of said supers to fully separate said frames from adhesion to the frames hanging in the upper super, upon upwardly rocking the tool.

7 Claims, 4 Drawing Figures

U.S. Patent   Oct. 14, 1975   3,911,513
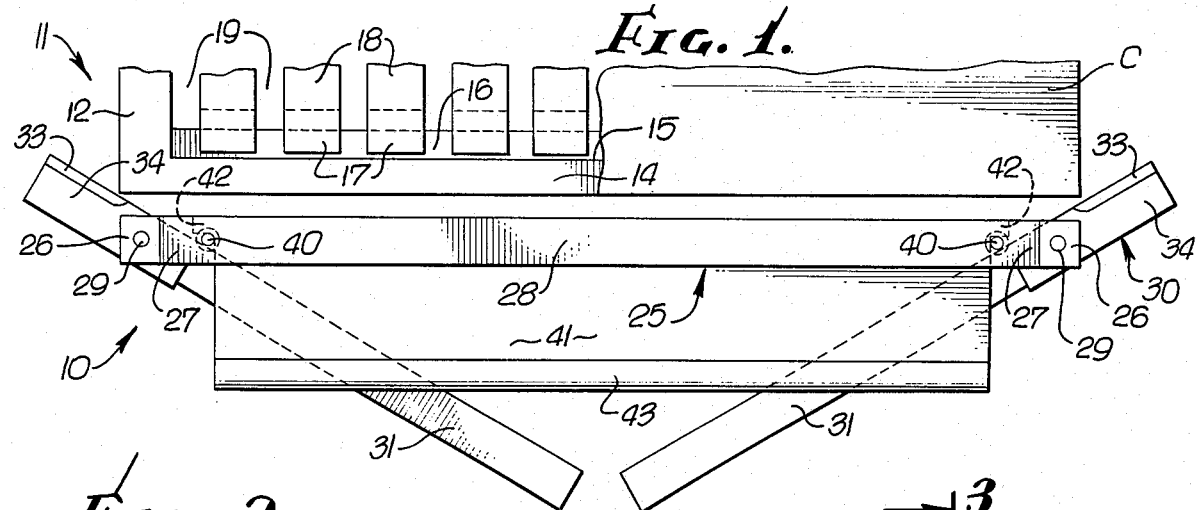
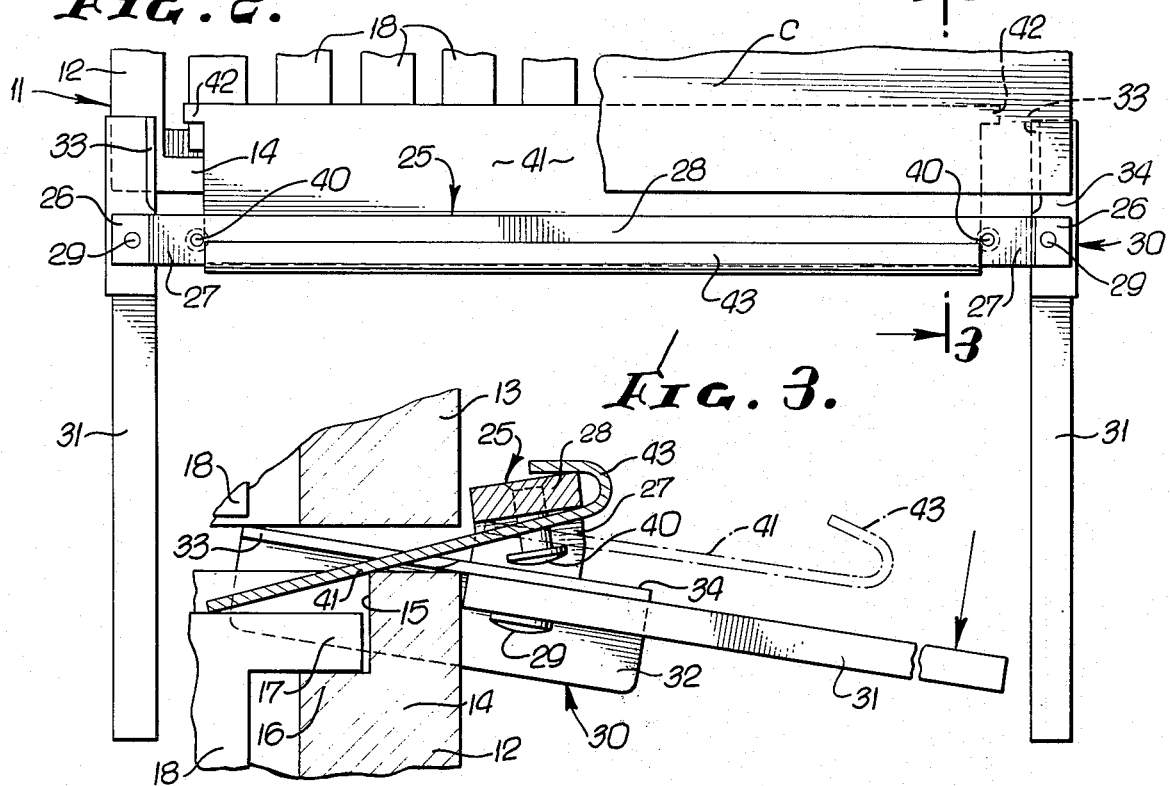
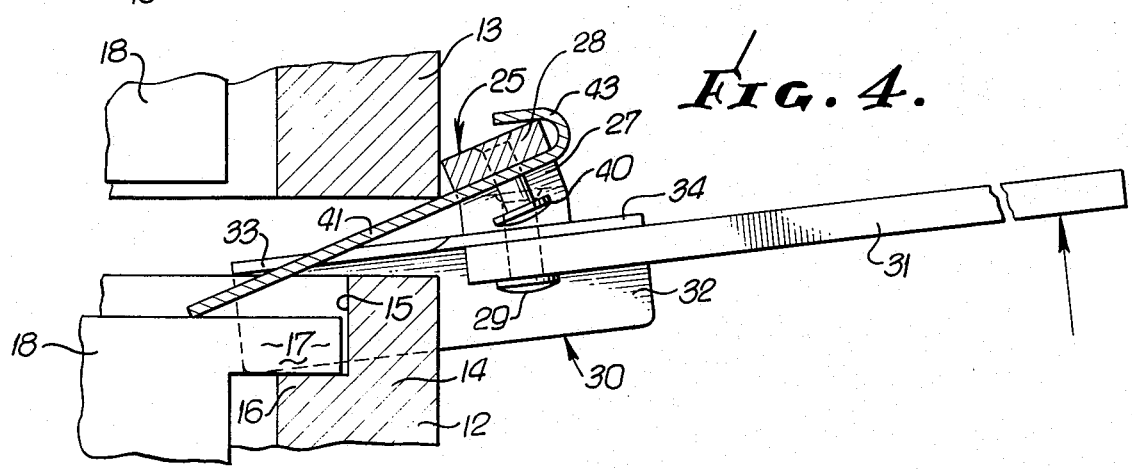

BEEHIVE OPENING TOOL

SUMMARY OF THE INVENTION

Honeybees have a tendency to fasten the bottom bars of the frames hanging in one super to the top bars of the super below by building wax comb in the bee space between said supers. In practice, when the beekeeper wishes to open a hive and remove the supers of honey, he uses a hive tool to pry the supers apart. Often the frames occupying two supers are waxed together so tightly that he would have to hold one end of the top super up with one hand to provide about a ¾ inch crack between the supers and then, working through this crack, pry each pair of frames apart, before the top super can be removed. As each frame is pried loose from the one above, it falls thus jarring the hive and riling the bees. Furthermore, the job itself, done in the manner above described as being in common practice, is tedious.

It is a principal object of the present invention to provide a beehive opening tool by which the opening of the hive can be accomplished with a minimum of labor and without riling the bees occupying the hive.

It is another object of the invention to provide such a tool which is simple to build and operate and can be sold at a reasonably low price and yet will have a long service life and can readily be folded for shipment.

BRIEF DESCRIPTION OF THE DRAWINGS

FIG. 1 is a plan view of the preferred embodiment of the invention partly unfolded as when being applied to one end of a beehive for opening the latter.

FIG. 2 is a view similar to FIG. 1 showing the rotating of the sheet steel angle wedges of the tool inwardly against the hive in the horizontal plane at which two supers of the hive meet, this view also illustrating the next step performed in the operation of the tool of the invention which consists in pressing down on the levers of the tool to further pry the upper super upwardly from the lower super to form a quarter inch space between said supers into which the frame depressing plate of the invention is then inserted forwardly as shown in this view.

FIG. 3 is a transverse vertical enlarged sectional view taken on the line 3—3 of Fig. 2 and illustrating two of the steps followed in employing said tool to open a hive.

FIG. 4 is a view similar to FIG. 3 and illustrating the final step followed in employing the tool of the invention to open a hive, in which the handles of the tool are lifted upwardly to completely separate the frames occupying the lower of said two supers from the frames occupying the upper of said supers.

DETAILED DESCRIPTION OF THE PREFERRED EMBODIMENT

The tool 10 of the invention is designed for opening a conventional Langstroth beehive 11. Only those portions of this hive which are actually engaged by the tool in performing its functions are illustrated in the drawings. The entire hive will be briefly described, however, to give the background of the invention. The hive has for its base, a flat rectangular bottom board having thin strips of wood nailed thereto to raise its side edges. This board is of the same width as each of a series of boxlike elements open at their tops and bottoms and which are referred to by the generic term "supers". Each of these supers has recesses in the inner upper edges of its end boards for supporting lugs extending endwise from a series of honeycomb frames, a series of ten of which normally hang vertically, side-by-side, spaced about three-eighths inch apart (referred to as "bee distance") in each of said supers. The lower super which rests directly on the bottom board is specifically referred to as the "brood chamber" and the supers superimposed on top of the brood chamber are specifically referred to as "honey supers". An outer cover C is placed on top of the uppermost honey super in the hive. The hive is occupied by a colony of bees propagated and governed by a queen bee who resides in the brood chamber in which the worker bees draw out the wax in the comb frames hanging in the brood chamber to form cells in which the queen lays eggs which are then closed and in due course of time the eggs layed therein hatch to supplement the numbers of the worker bees in the colony. As the life of the colony proceeds, through the various seasons of the year, the worker bees assume the task of foraging for honey which they bring back to the hive and store in cells produced by the worker bees themselves in the wax of the honeycomb frames hanging in the honey supers.

When the time arrives for harvesting the honey this is accomplished by separating the honey supers from each other, one at a time and separating the lowest honey super from the brood chamber in a gentle manner so as not to anger the bee colony and with the use of certain chemical expedients which causes the bees to leave the honey super so separated from the hive and enter the remainder of the hive so that ultimately they retreat to the brood chamber.

One of the problems of separating a honey super of the hive from the super immediately therebeneath so as not to rile up the bees of the colony is the inaccessibility of the comb bridges connecting upper and lower groups of comb frames to tools heretofore provided for parting said bridges. The tool 10 of the invention is designed to deal with this particular problem and for the purpose of illustrating the mode of operation of this tool, the hive 11 is fragmentarily shown in the drawings. Thus, the only parts of the hive shown is a lower honey super 12 and an upper honey super 13 and the hive cover C. As shown in FIGS. 1, 3 and 4, the super 12 has an end wall 14 having a recess 15 along its inside edge forming a shoulder 16 on which rests end lugs 17 formed at the upper outer corners of honeycomb frames 18, ten of which occupy super 12 in vertical parallel relation adjacent pairs of said frames being spaced by a bee distance 19 which is preferably about three-eighths inch.

The super 13 is also equipped with honey comb frames 18 in identically the same manner as the super 12.

The tool 10 of the invention includes a crossbar 25 which is approximately co-extensive in length with the end walls 14 of the supers 12 and 13. Bar 25 is preferably made of ¼ × ¾ inch bar stock which is die-formed just inwardly from outer end portions 26 to form short upwardly displaced and twisted sections 27 so that the central portion 28 of crossbar 25 is straight but inclined forwardly from the end sections 26 as indicated in FIGS. 3 and 4. The end sections 26 are coplanar with each other and have rivets 29 which pivotally unite said bar sections 26 with short sections 30 of steel sheet angle and front end portions of handles 31 formed of the same bar stock as the crossbar 25. The handles 31 fit snugly into the internal angles of the angle elements 30 so as to rigidly unite the elements 30 and 31 while allowing the two to rotate about the rivets 29 relative to the cross bar 25. The angle elements 30 have vertical webs 32 thereof disposed toward the outside of the tool while the free edges 33 of the horizontal webs 34 of the elements 30 face each other inwardly in a common plane. The edges 33 are sharpened for a reason to be made clear hereinafter. The straight central section 28 of crossbar 25 has provided therein at its ends, and extending downwardly therefrom, a pair of flat headed rivets 40 which act as side edge guides of a thin sheet metal plate 41 which is retained in assembled relation with crossbar 25 by the rivets 40 and by a pair of lugs 42 extending laterally from the front edge of plate 41 and by a flange 43 which is bent upwardly and forwardly from the rear edge of plate 41. The plate 41 is thus freely slidable on the crossbar 25 between a rearwardly retracted position in which it is shown in full lines in FIG. 1 and in broken lines in FIG. 3, and a forwardly extended position in which plate 41 is shown in full lines in FIGS. 2, 3 and 4.

It is to be noted that plate 41 is swingably related relative to crossbar 25 while said plate is in its forwardly extended position between a downwardly hanging relation with said crossbar as shown in FIG. 3 or an upwardly snugging related with crossbar 25 as shown in FIG. 4. When in the latter relation with crossbar 25 plate 41 flatly engages the bottom face of crossbar 25 and is for all practical purposes united with said crossbar so as to be caused to swing downwardly when crossbar 25 is rotated in a counterclockwise direction from the position in which it is shown in FIG. 4.

OPERATION

When the tool 10 is collapsed into a small compass for storage or for packaging for shipment, the hnndles 31 are swung into parallel slightly overlapping relation. In preparing the tool 10 for performing its function of opening beehive 11, the arms 31 are swung rearwardly approximately as shown in FIG. 1 and the tool 10 is manually located with the plate 41 in fully retracted position and with the sharpened inner edges 33 of the wedge angle members 30 in coplanar opposed relation as shown in FIG. 1 in which edges 33 lie in the horizontal plane in which the bottom of upper super 13 rests on the top of lower super 12 and with edges 33 contacting the corners of both of said supers in said plane. With the tool 10 so positioned, the handles 31 are swung outwardly into parallelism causing the sharpened edges 33 of the tool 10 to converge upon and penetrate between said supers as shown in FIG. 2, thereby separating these corner portions of said super by the thickness of the webs 34 of said wedge elements 30.

This slight but positive separation of the front corners of the two supers, 12 and 13, is accomplished very gently with no possibility of disturbing the bees in the hive. It further results in inserting the wedge webs 34 of the tool between the juxtaposed walls of said supers so that by placing a fairly slight downward pressure on the handles 31 with these in parallel position as shown in FIG. 2, and as illustrated in detail in FIG. 3, the supers 12 and 13 are separated vertically a sufficient distance to freely admit the plate 41 when this is manually pushed forward from its retracted position to its fully advanced position as shown in FIG. 3.

It is to be noted that the plate 41 when thus advanced overlies all of the honeycomb frames 18 which are hanging in lower super 12.

The next step in operating the tool 10 in order to fully separate the super 13 upwardly from the super 12, without disturbing the position in which the frames 18 hang in super 12, is to lift upwardly on the tool handles 31 so as to swing these from the position shown in FIG. 3 to the position shown in FIG. 4 in which the plate 41 becomes locked in non-rotatable relation with crossbar 25 so that when counterclockwise rotation of the tool 10 is continued from the position in which it is shown in FIG. 4, there is a coincidence of upward pressure against the upper super 13 and a downward pressure against the lower super 12 and at the same time a pressure by the plate 41 downwardly against the frames 18 hanging in the super 12. These coincidental pressures will part any wax comb bridges built by the bees connecting the frames 18 of the lower super 12 with the frames 18 occupying the upper super 13.

Ordinarily the application of the tool 10 in the manner above described to one end of the hive 11 will fully part any comb bridging built between the frames in the upper and lower supers being pried apart by said tool so that the frames in the lower super will remain in place thus obviating any disturbance of the bees which would provoke them into attacking the beekeeper. In extreme cases of bridging, the separation of juxtaposed supers accomplished as shown in FIG. 4 at one end of the hive could be supplemented by an insertion of pegs between the supers at that end of the hive, thus freeing the tool 10 for applying the same in a similar manner to the opposite end of the hive.

I claim:

1. A beehive opening tool comprising:
a crossbar approximately co-extensive in length with the front end of a beehive which said tool is designed to open;
relatively thin wedge means having rearwardly extending handles and pivotally mounted on vertical axes on end portions of said bar said wedge means, when swung inwardly towards each other in the horizontal plane at which two superposed supers of said hive meet, penetrate between said supers and wedge said supers apart by the thickness of said wedge means, said handles then serving as levers when rocked vertically, to exert an upward prying action through said wedge means to pry said supers further apart.

2. A tool as recited in claim 1 wherein
a frame depressing plate is provided which is adapted to be slipped into the space produced between said supers by the aforesaid wedging and prying action so as to overlie the comb frames occupying the lower of said supers; and
means connecting said plate with said crossbar for rotating said plate downwardly against said frames when a reverse prying action is effected for separating said supers by lifting on said handles.

3. A tool is recited in claim 2 wherein
means is provided on said crossbar and plate to retain said plate assembled on said tool and slidable between a retracted position and a position in which said plate is extended forwardly from the tool as aforesaid.

4. A tool as recited in claim 3 wherein said assembly means includes a pair of flat headed studs mounted in said crossbar to extend downwardly therefrom closely adjacent opposite ends of said plate;

a pair of lugs extended laterally from a front edge portion of said plate and preventing withdrawal rearwardly of said plate from between said studs; and a back edge portion of said plate bent upwardly and forwardly to embrace a rear edge portion of said crossbar when said plate is extended forwardly to its advanced position in said tool to limit said advanced position of said plate and to lock said plate to said crossbar for applying a downward pressure from said tool through said plate to said frames in said lower super by lifting on the handles of said tool.

5. A tool as recited in claim 2 in which said crossbar is provided with an upward offset and an upward forward twist at points just inwardly from the end portions of said bar on which said wedge means are pivotally mounted; and wherein said plate is provided with an upward and forward bend in a rear edge portion thereof which hooks over the rear edge of said crossbar when said plate is extended between said supers during the operation of said tool for separating said supers, the hooking of said bend in said plate over said crossbar locking said plate to said crossbar thereby applying downward pressure to the frames occupying the lower of said supers when a prying action is applied in separating said supers by lifting on the handles of said tool.

6. A combination as recited in claim 1 wherein said wedge means comprises a pair of metal angle sections having horizontal wedge webs, said wedge means being pivotally connected, with end portions of said crossbar, these connections being made by rivets which also connect said horizontal webs to said handles of said tool;

said angle sections also having vertical webs limiting the extension of said horizontal wedge webs inwardly between said supers in the initial application of said tool to said hive.

7. A beehive opening tool comprising:

a frame hold-down plate;

dual co-planar wedge means spaced apart to receive therebetween a beehive including a pair of superposed supers with the horizontal plane at which said supers meet coinciding with the plane of said wedge means;

manually operable power means for shifting said wedge means inwardly in said plane to penetrate between and separate said supers by the thickness of said wedge means, said power means being then operable to rotate said wedge means to further pry apart said supers a sufficient distance to allow insertion of said plate between said supers with said plate overlying frames occupying the lower of said supers, said frames being normally tied to the frames occupying the upper of said supers by wax bridges built by the bees; and means connecting said power means with said plate for rotating the plate with the balance of the tool to hold said lower frames down while further lifting said upper super to part said wax bridges and thus fully separate said upper and lower supers.

* * * * *